Jan. 10, 1961 J. C. BUCKREUS Re. 24,922
HOSIERY AND METHOD OF FORMING SAME
Original Filed Jan. 14, 1955
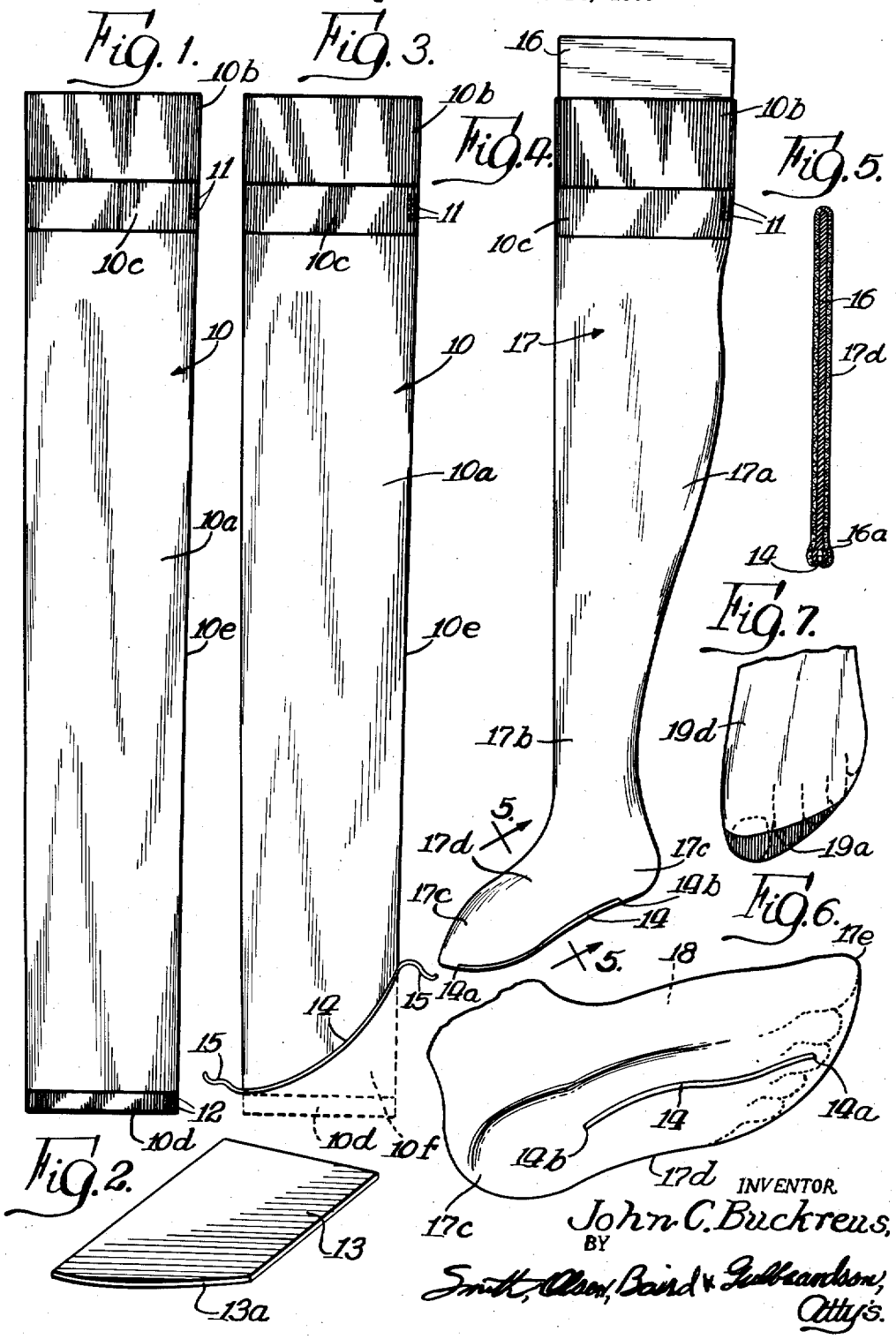

United States Patent Office

Re. 24,922
Reissued Jan. 10, 1961

24,922

HOSIERY AND METHOD OF FORMING SAME

John C. Buckreus, Hartford, Wis., assignor, by mesne assignments, to United States Trust Company of New York, New York, N.Y.

Original No. 2,825,215, dated Mar. 4, 1958, Ser. No. 481,737, Jan. 14, 1955. Application for reissue Feb. 26, 1959, Ser. No. 795,880

11 Claims. (Cl. 66—185)

Matter enclosed in heavy brackets [ ] appears in the original patent but forms no part of this reissue specification; matter printed in italics indicates the additions made by reissue.

This invention relates to improvements in women's hosiery and its purpose is to provide hosiery having an improved shaped foot and to provide a novel method of forming such hosiery. More particularly, the purpose of the invention is to provide hosiery having heel and toe portions which are comparatively thin or "sheer" and which are free of visible seams.

It is the present fashion in certain types of women's shoes to provide open heel and toe portions through which the hosiery is visible. Women's hosiery has not heretofore been satisfactory for use with these shoe styles because of its unsatisfactory appearance in those areas. For example, full fashioned hosiery has seams extending longitudinally around the heel and beneath the foot and toe portions, thus resulting in seams which are visible when the hosiery is worn. Similarly, seamless hosiery requires a looping operation to close the toe opening with resulting visible seams. With circular knit hosiery it is necessary to use a relatively heavy nylon yarn in the toe portion in order to provide a fabric heavy enough to facilitate and reduce the cost of the looping operation and a heavier yarn has also been used in the heel portions in order to increase the wearing qualities and to give a symmetrical appearance to the foot portion as a whole. The types of hosiery just referred to have not been suitable for wear with shoes having open heels and toes because of the visible seams and the relatively thick fabric in the heel and toe portions.

The principal object of the present invention is to provide improved women's hosiery having heel and toe portions which are thin and free of visible seams. A further object is to provide hosiery having a foot portion which is closed by seaming before its shape has been imparted thereto. Another object is to form hosiery having a [full fashioned] foot *shape ordinarily produced in full fashioned hosiery, the foot shape of the present invention being provided* by an improved method comprising the steps of knitting a seamless tube, closing the end of the tube by a seam, and then molding and shaping a foot portion with the seam located entirely on the bottom of the foot portion so that it is not visible when the stocking is worn. Still another object of the invention is to provide an improved method of forming hosiery with the elimination of the time consuming and costly looping operation which has heretofore been necessary. Other objects relate to various features of the improved hosiery and to details of the improved method which will appear more fully hereinafter.

The nature of the invention will be understood from the following specification taken in connection with the accompanying drawings in which one embodiment of the improved hosiery and a modification thereof are illustrated in connection with the disclosure of the improved method.

In the drawings,

Figure 1 shows a side elevation of a knitted seamless tube which is the product of the first step of the improved process;

Fig. 2 shows a perspective view of a template which is used in marking the line of stitching to be employed in closing the end of the tube shown in Fig. 1;

Fig. 3 shows a side elevation of the tube illustrated in Fig. 1 after the lower end thereof has been closed by a curved line of stitching and after the lower portion of the tube has been cut off below the stitching;

Fig. 4 shows a side elevation of a stocking form having the tube shown in Fig. 3 applied thereto, after it has been trimmed, for the purpose of imparting the shape of the finished hosiery to the tube preliminary to a setting operation;

Fig. 5 shows an enlarged sectional view taken on the line 5—5 of Fig. 4;

Fig. 6 shows a perspective view of the bottom of the foot of the stocking when being worn, illustrating the location of the seam with respect to the foot of the wearer; and Fig. 7 is a perspective view of the toe portion of a modified form of the invention in which the toe portion is reinforced.

In the practice of the present invention the first step consists in knitting from nylon yarn or the like on a circular knitting machine a seamless tube 10, shown in Fig. 1, which is preferably slightly tapered toward the bottom *but with each course being complete and each course having the same number of wales therein.* For illustration, the tube 10 may be 40 inches long and have a width of 7 inches at the top as compared with a width of 6 inches at the bottom. In knitting the tube 10, the body portion 10a is preferably knitted from fine yarn such as 15 denier yarn and the tube is provided at the top with a double welt 10b and a shadow welt 10c which are formed of heavier yarn. The tube 10 is also preferably provided at the bottom with a toe welt 10d which is formed of yarn heavier than the yarn used in knitting the body portion 10a in order to limit or overcome the tendency of the tube to curl up at the bottom. A 55 denier yarn may preferably be employed in knitting the toe welt 10d. The tube 10a is provided on opposite sides of one edge 10e, when the tube is laid flat, with two series of tuck stitches 11 which are located on opposite sides of the fold line 10e in order to indicate the proper location of this fold line when the tube is laid flat after knitting. Another series of tuck stitches 12 [are] *is* provided on opposite sides of the fold line 10e in the toe welt 10d so that the operator can determine the proper location of the fold line throughout the length of the flattened tube.

After the tube 10 has been knitted and laid flat with the fold line 10e properly located by the tuck stitches 11 and 12, a template 13 formed of sheet metal, cardboard or the like, is laid on the flattened tube with the tip of its lower curved surface 13a located adjacent to the upper edge of the toe welt 10d. A mark is then drawn on the tube along the edge 13a to indicate the line of the stitching which is then employed to close the tube. A seaming machine is then employed to form a diagonal curved line of stitching 14 along the mark which has been placed on the tube with the use of the template 13 and at the same time the portion 10f of the tube beneath the line of stitching is cut off by the machine, leaving portions of the sewing thread 15 projecting at opposite ends of the seam.

Having closed the end of the tube 10 by the *single* seam 14 *only*, the tube is then preset in a closed steam chamber for approximately five minutes at a temperature of about 208° Fahrenheit. This presetting operation may be performed with the tube suspended in a loose unstressed condition and the result of this presetting operation is primarily to lock the stitches of the line of seaming 14 so that the tube may then be trimmed along the seam. This is done manually during the inspection of the tube and the projecting ends 15 of the sewing thread are then cut off.

After the inspection and trimming of the tube 10 it is placed upon a hosiery form 16 in the form of a flat plate having the proper edge conformation to impart to the tube 10 the shape of the finished hosiery as illustrated in Fig. 4. The form 16 is so shaped that it imparts to the tube the shape of the finished hosiery 17 having a leg portion 17a of the shape ordinarily produced in full fashioned hosiery, an ankle portion 17b, a heel portion 17c, *and* a foot portion 17d [, and] *which includes* a toe portion 17e. In placing the tube on the form 16 the seam 14 is located directly beneath the foot of the form and is positioned by a groove 16a in the bottom edge of the foot portion of the form, as illustrated in Fig. 5. The forward extremity 14a of the seam is located rearwardly of the extreme tip of the toe portion of the form, as shown in Fig. 4, and the seam should preferably be of such length that the other extremity 14b thereof terminates forwardly of the heel portion 17c.

When the tube has been positioned on the form 16 to impart to it the shape of the finished hosiery 17, the form with the tube mounted thereon is placed in a steam chamber and subjected to the action of saturated steam at a temperature of about 260° F. and at a pressure of about 28 pounds per square inch for a period of one minute. This results in permanently setting the knitted seamless tube in the form of the finished hosiery 17 with the heel portion 17c, the foot portion 17d, and the toe portion 17e molded to the shape of the form 16. During this setting operation the form 16 is, of course, normally located in an inverted position as compared with that shown in Fig. 4.

After the setting of the hosiery 17 on the form 16 it is stripped from the form and is dyed in a liquid dye bath at a temperature of approximately 180° F. After the dyeing operation, the hosiery is placed again upon a hosiery form of the required shape and is subjected to a final boarding operation at a temperature of about 250° F., thus resulting in the finished stocking which is then stripped from the final boarding form.

The foregoing process results in the production from a seamless tube knitted on a circular knitting machine of a stocking having a fashioned shaped including a fashioned foot portion which [is] *in its preferred form has the same number of wales as the leg portion, the stocking being* seamless except for the seam 14 which is located on the bottom of the foot portion so that it is located entirely beneath the foot 18 of the wearer, as illustrated in Fig. 6, and terminates short of the extreme toe portion of the foot 18. In this way there is produced a fashioned stocking which has heel and toe portions which are as thin and sheer as the body portion and which may be worn with shoes having open toes and heels without revealing any part of the single seam 14 which is located beneath the foot.

If desired a heavier yarn may be employed in knitting the lower part of the tube 10a adjacent to the toe welt 10d so that the toe of the stocking will be reinforced by yarn of heavier gauge, as shown at 19a in Fig. 7, where the foot portion 19d of the stocking is otherwise the same as that shown in Fig. 4.

Although one form of the improved stocking with a modification of the toe portion thereof has been shown and described in connection with the explanation of one method of practicing the improved process, it will be understood that both the hosiery and the method may be modified in various ways without departing from the scope of the appended claims.

I claim:

1. A *knitted* stocking having only one seam which is located entirely on the under side of its foot portion and extends longitudinally thereof, *the forwardmost end of said seam terminating rearwardly of the tip of the toe of said stocking.*

2. A *circular knit* stocking having leg [, ankle, heel,] *and* foot [and toe] portions *knitted of a body yarn, all complete courses knitted of the body yarn having the same number of wales therein,* [all of said portions being knit from a single yarn,] said stocking being closed after knitting by a single seam *only* which is located entirely on the bottom of said foot portion and extends longitudinally thereof.

3. A *knitted* stocking having leg, ankle, heel, foot and toe portions, [all of said portions being knit from a single yarn,] said stocking being closed after knitting by a single longitudinal seam which is located entirely on the bottom of said foot [portion] *and toe portions,* said seam beginning rearwardly of the tip of said toe portion.

4. A *knitted* stocking having leg, ankle, heel, foot and toe portions, [all of said portions being knit from a single yarn,] said stocking being closed after knitting by a single seam which is located entirely on the bottom of said foot [portion] *and toe portions,* said seam beginning rearwardly of the tip of said toe portion and terminating adjacent the forward margin of said heel portion.

5. The method of forming a stocking which comprises the steps of knitting a seamless tube, closing one end of said tube by a diagonal curved seam and cutting off the end portion of the tube outside of said seam, placing said closed tube on a hosiery form *with the forward end of the seam displaced rearwardly from the tip of the toe portion of said form,* and setting said tube on said form to impart thereto permanently the shape of said form.

6. The method of forming a stocking *having a single seam only* which comprises the steps of knitting a seamless tube, closing one end of said tube by a *single* diagonal curved seam *only* and cutting off the end portion of the tube outside of said seam, placing said closed tube on a hosiery form, setting said tube on said form to impart thereto permanently the shape of said form, dyeing the set fabric, and then subjecting the resulting stocking to a final boarding and setting step.

7. The method of forming a stocking which comprises the steps of knitting a seamless tube [from a single yarn], closing one end of said tube by a curved seam and cutting off the end portion of the tube outside of said seam, placing said closed tube on a shaped hosiery form having a foot portion with said seam located on the under side of said foot portion and with the forward end of said seam displaced rearwardly from the tip of said foot portion, and then setting said closed tube on said form to impart to said tube permanently the shape of said form.

8. The method of forming a stocking which comprises the steps of knitting a seamless tube [from a single yarn], closing one end of said tube by a curved seam and cutting off the end portion of the tube outside of said seam, placing said closed tube on a shaped form having a foot portion which includes a heel portion and a toe portion with said seam located on the under side of said foot portion, the forward end of said seam being displaced rearwardly of the tip of said toe portion and the rear end of said seam being located forwardly of said heel portion, and then setting said closed tube on said form to impart to said tube permanently the shape of said form.

*9. The method of forming a stocking having a single seam only which comprises the steps of knitting from a body yarn first a leg portion and then a foot portion in the form of a seamless tube with the same number of wales in each course knitted of the body yarn, closing one end of said tube in the foot portion by a single diagonal curved seam only and cutting off the end portion of the tube outside of said seam, placing said closed tube on a hosiery form, and setting said tube on said*

*form to impart thereto permanently the shape of said form.*

*10. A circular knit stocking having leg and foot portions knitted with the same number of wales in each complete course thereof, said stocking having only one seam which is located entirely on the under side of said foot portion and extends longitudinally thereof, the forwardmost end of said seam terminating rearwardly of the tip of the toe of said stocking.*

*11. A circular knit stocking having leg and foot portions knitted of a body yarn, all complete courses knitted of the body yarn having the same number of wales therein, said stocking having only one seam which is located entirely on the underside of said foot portion and extends longitudinally thereof, the forwardmost end of said seam terminating rearwardly of the tip of the toe of said stocking.*

References Cited in the file of this patent or the original patent

UNITED STATES PATENTS

| | | |
|---|---|---|
| 1,841,205 | Page et al. | Jan. 12, 1932 |
| 2,157,119 | Miles | May 9, 1939 |
| 2,695,507 | Tew | Nov. 30, 1954 |
| 2,699,056 | Margulies | Jan. 11, 1955 |
| 2,703,972 | Reymes-Cole et al. | Mar. 15, 1955 |
| 2,709,353 | Poole | May 31, 1955 |
| 2,740,279 | Getaz | Apr. 3, 1956 |